United States Patent [19]

Miga et al.

[11] 4,404,155

[45] Sep. 13, 1983

[54] METHOD OF FORMING GAS CHROMATOGRAPHIC SUPPORTS

[75] Inventors: Christian J. Miga, Littleton, Colo.; Millard Mills, Santa Barbara, Calif.

[73] Assignee: Manville Service Corporation, Denver, Colo.

[21] Appl. No.: 345,274

[22] Filed: Feb. 3, 1982

[51] Int. Cl.³ ............................................. C04B 35/64
[52] U.S. Cl. ..................................... 264/67; 501/133; 501/144
[58] Field of Search .................... 264/67, 63; 501/133, 501/144

[56] References Cited

U.S. PATENT DOCUMENTS

| | | | |
|---|---|---|---|
| 3,392,507 | 7/1968 | Ottenstein | 55/67 |
| 3,431,123 | 3/1969 | Zrimsek | 501/133 |
| 3,463,650 | 8/1969 | McCrught | 501/133 |
| 4,141,945 | 2/1979 | Anderssen | 264/63 |
| 4,162,284 | 7/1979 | Dahl | 264/63 |

Primary Examiner—John A. Parrish
Attorney, Agent, or Firm—Cornelius P. Quinn

[57] ABSTRACT

A support for gas chromatography is formed by incorporating a fluxing material in a water solution that is mixed with bentonite clay and diatomaceous earth which is then separated into masses, dried, crushed, calcined, crushed and separated into various mesh sizes for use as chromatographic supports.

9 Claims, No Drawings

METHOD OF FORMING GAS CHROMATOGRAPHIC SUPPORTS

TECHNICAL FIELD

This invention relates to the preparation of supports for use in gas chromatography.

BACKGROUND OF PRIOR ART

Gas chromatographic supports have been manufactured in the past using a process described in U.S. Pat. No. 3,392,507. In this process, a brick is formed from a mixture of diatomaceous earth, clay and water pressed into a brick form and calcined at 900° C. The brick is then crushed to 30–60 mesh, coated with a fluxing solution and then calcined for 6 hours at about 2100° F. when a fluxing agent such as potassium hydroxide or potassium carbonate is used. A modification of this process was developed wherein the blended diatomaceous earth and this process was developed wherein the blended diatomaceous earth and bentonite clay are pelletized instead of being pressed into a brick.

SUMMARY OF THE INVENTION

In this invention, the blended diatomaceous earth and bentonite clay used to form the pellets includes a fluxing solution. The fluxed pellets are dried, crushed to a desired mesh and transferred to a kiln for calcining at temperatures of about 1800° to 2100° F. with a retention time of about 25 to 45 minutes. The material is further crushed and separated into various mesh sizes. Thus, the invention eliminates one calcining operation and saves additional energy by reducing the total retention time during calcination.

DESCRIPTION OF THE PREFERRED EMBODIMENT

A chromatographic support was made by combining 1% to 2% by weight of bentonite clay with 98% to 99% by weight of diatomaceous earth and deposited in a ribbon mixer in a total weight of about 200 pounds. A water solution containing 7.0% to 9.0% by weight of a flux material, specifically potassium carbonate, in an amount of 38% to 42% by weight of the combined bentonite clay and diatomaceous earth was sprayed into the ribbon blender onto the combined bentonite clay and diatomaceous earth. The blend was mixed for about 25 to 40 minutes until an extrudable material was obtained. This material was extruded through a 4 inch extruder using a die having seven 1⅛ inch diameter holes. Knives were used to cut the extrudate into pellets of about ¼ inch in length. This material was transferred to a three stage dryer having temperatures of about 320° F. in the first stage, about 200° F. in the second stage and about 180° F. in the third stage. Retention time in the dryer was about 30 minutes. After leaving the dryer, the material was subjected to a roll crusher to form material, all of which passes through a 20 mesh screen. This material was then transferred to a rotary kiln and calcined at temperatures of about 1900° to 1975° F. The feed rate to the kiln was at about 450 lbs/hr with a retention time in the kiln of about 30 minutes. After calcination, the material was further crushed and separated into mesh sizes from about 30 to 140. The finished support had a surface area in the range of 0.4 to 1.0 $m^2/g$ and a density between 25 to 35 $lbs/ft^3$. Chromatographic testing showed this material to be equal to CHROMOSORB G, a chromatographic support, marketed by Manville Products Corporation.

The bentonite clay used in the preceding paragraph was −200 mesh low to medium swelling marketed by Black Hills Bentonite. The diatomaceous earth was crude and the potassium carbonate was calcined granulate marketed by Diamond Shamrock.

In forming chromatographic supports in accordance with the present invention, the bentonite clay can be present in amounts from 0.5% to 3.0% by weight and the diatomaceous earth in amounts of from 97% to 99.5% by weight. The water solution can contain between 6% to 9% of potassium carbonate and is added in amounts from 36% to 50% by weight of the blended bentonite clay and diatomaceous earth. The retention time in the dryer can be from about 20 to 45 minutes and in the calcining kiln from about 20 to 45 minutes at temperatures from 1800° to 2100° F. Other fluxing materials include alkali metal hydroxides, alkali metal carbonates, alkali metal oxides and alkali metal halogenates such as potassium hydroxide, sodium hydroxide, sodium carbonate and sodium fluoride. The amount of fluxing material varies with the material used, as described in U.S. Pat. No. 3,392,507, and may be used in a range of 1% to 9%.

If the density of the chromatographic support is too high, the die is removed from the extruder. The extrudate passes from the extruder and is collected as a plurality of loosely formed agglomerates which are then processed in the same manner as the pellets.

In addition to the advantage of eliminating one calcining operation, it was noted that about 18% more support was being obtained in the most desirable mesh size, that is, support passing through 80 mesh screen and retained on a 100 mesh screen.

It is to be understood that variations and modifications of the invention, as illustrated by specific examples herein may be made without departing from the spirit and scope of the invention. It is also to be understood that the scope of the invention is not to be interpreted as limited to the specific embodiments disclosed herein but only in accordance with the appended claims, when read in the light of the foregoing description.

We claim:

1. A method of forming gas chromatographic supports comprising:
   (a) blending together bentonite clay and diatomaceous earth wherein said bentonite clay is present in amounts between 0.5% to 3.0% by weight and said diatomaceous earth is present in amounts between 97% to 99.5% by weight;
   (b) forming a water solution containing between 1% to 9% of a flux material;
   (c) spraying said water solution onto said blended bentonite clay and diatomaceous earth in amounts between 36% and 50% by weight of said blended bentonite clay and diatomaceous earth and mixing to form a composition;
   (d) forming said composition into a plurality of separate masses;
   (e) drying said masses and crushing them to a predetermined mesh size;
   (f) calcining said crushed masses for a period of time from about 20 to 45 minutes at temperatures of from about 1800° to 2100° F.; and
   (g) crushing said calcined crushed masses and separating into various mesh sizes from about 30 to 140 mesh.

2. A method as in claim 1 wherein:
(a) said bentonite clay is present in amounts between 1% to 2% by weight and said diatomaceous earth is present in amounts between 98% to 99% by weight; and
(b) said water solution is in amounts between 38% and 42% of said blended bentonite clay and diatomaceous earth.

3. A method as in claim 2 wherein said flux material is selected from the group consisting of:
(a) alkali metal hydroxides, alkali metal carbonates, alkali metal oxides and alkali metal halogenates.

4. A method as in claim 2 wherein:
(a) said water solution contains 6% to 9% of a flux material.

5. A method as in claim 4 wherein said flux material comprises:
(a) potassium carbonate.

6. A method as in claim 4 wherein:
(a) said calcining is for a period of time of about 30 to 35 minutes at temperatures of from about 1900° to 1975° F.

7. A method as in claim 6 wherein:
(a) said predetermined mesh size is such that all of said crushed particles pass through a 20 mesh screen.

8. A method as in claim 7 wherein:
(a) said masses are pellets.

9. A method as in claim 7 wherein:
(a) said masses are loosely formed agglomerates.

* * * * *